March 13, 1962 H. ENDRES 3,025,495

AUTOMATIC CHARACTER RECOGNITION

Filed Jan. 12, 1959 3 Sheets-Sheet 1

INVENTOR.
H. ENDRES
BY Robert Harding Jr.
ATTORNEY

INVENTOR.
H. ENDRES
BY Robert Harding Jr.
ATTORNEY

INVENTOR.
H. ENDRES
BY
Robert Harding Jr.
ATTORNEY.

United States Patent Office 3,025,495
Patented Mar. 13, 1962

3,025,495
AUTOMATIC CHARACTER RECOGNITION

Hermann Endres, Stuttgart-Mulhausen, Germany, assignor to International Standard Electric Corporation, New York, N.Y., a corporation of Delaware Filed Jan. 12, 1959, Ser. No. 786,127
5 Claims. (Cl. 340—149)

Figure 1:
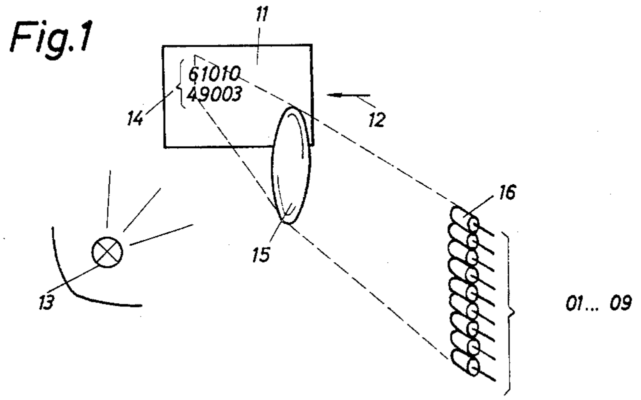

The invention relates to automatic character recognition, in particular to a apparatus for the automatic recognition of printed characters, which are scanned either along predetermined lines or fully in parallel in a raster-shaped manner optically, magnetically, galvanically or electrostatically.

In the copending application, Serial Number 747,689, it is already proposed to store the scanning signals in a two-dimensional shift register, permitting a shifting of the stored informations in the line-direction and/or column-direction. The information can be evaluated e.g. by providing one coincident circuit for each character to be recognized, connecting all of those outputs of the storage cells with each other in which a criterion "white" or "black" is supposed to be stored for the respective character. Also by means of this method such characters are supposed to be evaluated which, during the storing operation, did not come to lie exactly on the coincidence circuits. Thereupon the stored characters are displaced in spirals or meanders in the shift register until they are brought into coverage with the respective coincidence circuit. This displacement or shifting requires extensive controlling arrangements.

Object of the invention is to simplify the coincidence reading or scanning.

The method according to the invention is characterized by the fact that the characters are scanned in a column- or line-wise manner, and in that the respective character signals are stored either in the first or the last column or line of the shift register, whereas simultaneously the already stored signals are transferred one storage cell in the line- or column-direction, and in that the completely stored character is shifted vertically in relation to the storing direction for obtaining the optimum coincidence reading.

The method according to the invention combines with the storing a partial centering of the character to the coincidence circuits, so that subsequently to the storing process identical characters will always appear at the same point in the line- or column-direction.

It enables a continuous shifting of either the character record means or of the scanning devices in the scanning direction. The division into columns is effected in that the character signals of the scanning devices are simultaneously transferred to the shift register by the pulses of a generator.

Appropriately the characters are scanned by a chain of photo-electric transducers, the individual elements of which are connected via one amplifier to the cells of one column of the shift register.

However, it may also be of advantage to use for the scanning purpose an arrangement comprising a cathode-ray tube and a photo-electric cell, as well as a storage chain and a counter which is connected by the photo-electric cell to the individual elements of the storage chain, and furthermore comprising two generators. One of these generators is adapted to effect the scanning of the character and is operated so long as character signals appear at the outputs of the storage chains. The other generator is adapted to effect the scanning of the space between two characters and is operated so long as character signals are lacking at the outputs of the storage chain. It is appropriate that the latter of the generators be operated at a higher frequency than the first one. For unambiguously assigning or coordinating the cells of the storage chain to the individual points which are passed by the cathode ray, it appears to be appropriate to let the counter also act as a step-by-step switch for the deflecting voltage of the cathode-ray tube.

For the storing and the transferring of the character signals within the shift register it is favourable to provide a special generator which is operated only as long as character signals appear at the outputs of the amplifier or the storage chain.

The shifting of the characters vertically in relation to the storing direction is then effected by means of another generator which is switched on by the lacking of character signals at the outputs of the amplifier or the storage chain. This generator will be switched off whenever the character signals appear in a certain or predetermined line of the shift register, or whenever the character signals appear in at least $n$ predetermined successive lines. In this cases $n \leqq m$, and $m$ is the minimum number of lines appearing for one character. It is of advantage if the last mentioned generator is operated at a higher frequency than the previously mentioned one.

In cases where the scanning is performed with the aid of a cathode-ray tube the storing and transferring may also be effected by providing a zero position in the counter, in which the contents of the storage chain in transmitted to the shift register and in which, simultaneously, the storage chain is erased whenever a predetermined generator is operative.

If, by the oblique position of a copy or pattern to be read, there appears in addition to one line the complete neighbouring line within the scanning range, then a comparator will effect the switching-off of the generator, which will then vertically displace the character when the number of the shifting steps of the preceding character and of the stored character do not differ from each other or only by a slight amount, and when the character signals appear in at least $n$ predetermined and successively following lines. Besides the already mentioned advantage whereby a partial centering of the character with respect to the coincidence circuits can be achieved, together with the storing, the present invention still bears further advantages. Thus, for instance, there are only required so many scanning devices as there are lines or columns in the shift register. Furthermore it is now also possible continuously to move the record means or the scanning devices. In addition thereto the shift register only needs to correspond to the maximum width of the characters.

Figure 3:
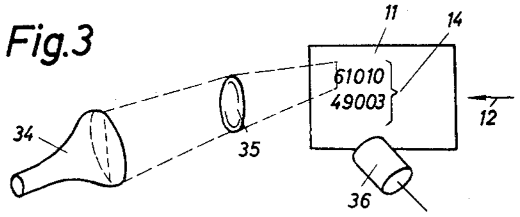
Figure 2:
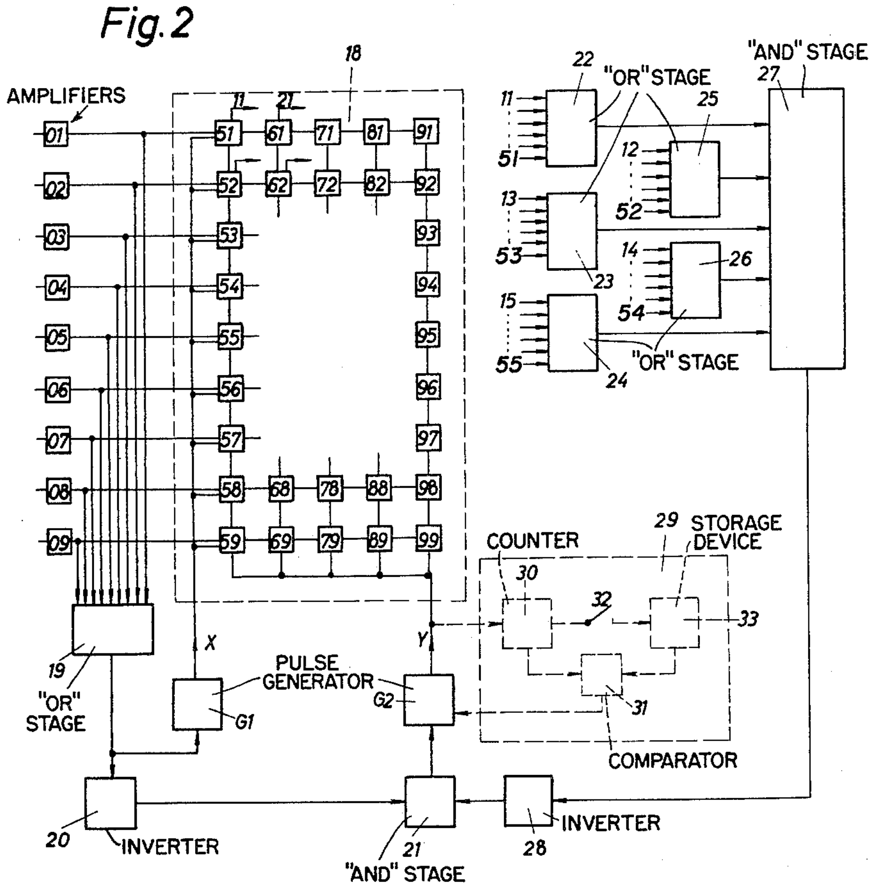
Figure 4:
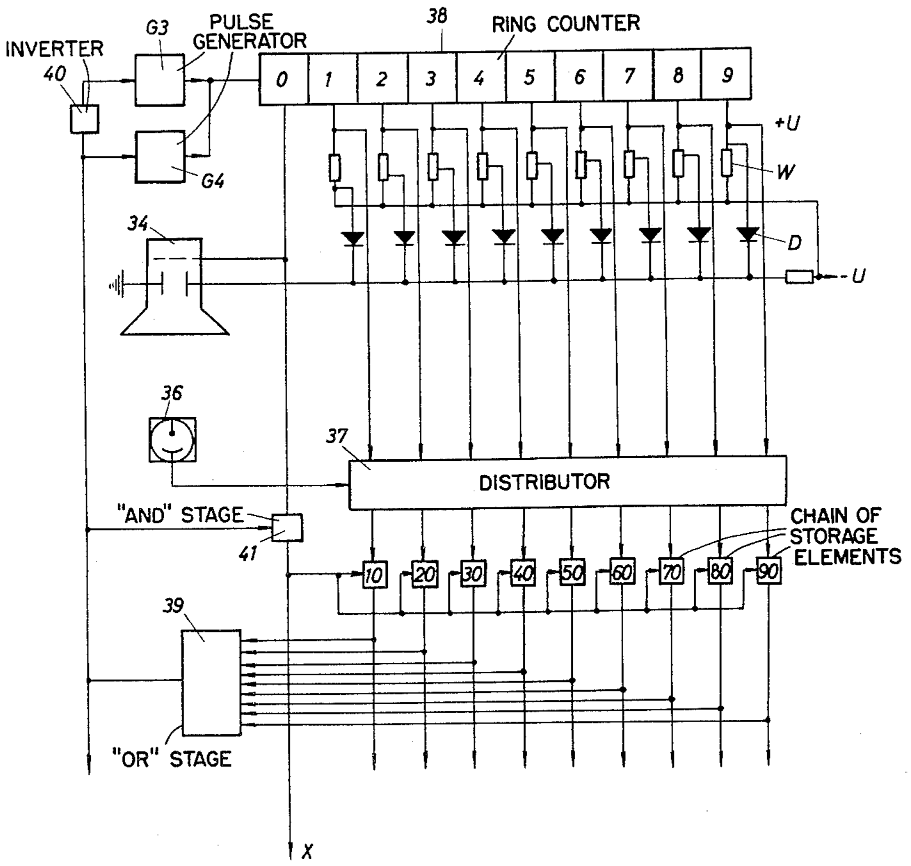

In the following description the invention will now be described in particular with reference to FIGS. 1–4 of the copending drawings, in which:

FIG. 1 shows an arrangement for scanning the characters with the aid of a chain of photo-electric transducers, FIG. 2 shows an arrangement for controlling the centering of the character within the shift register, FIG. 3 shows an arrangement for scanning the characters with the aid of a cathode-ray tube, and FIG. 4 shows an arrangement for controlling the character scanning with the aid of a cathode-ray tube.

In the arrangement as shown in FIG. 1 it is assumed that the character record means 11 is moved continuously in the direction as indicated by the arrow 12. The record means 11 is illuminated by a light source 13. The characters 14 are imaged by a lens system 15 on the photo-electric transducer chain 16. The outputs of these photo-electric transducers lead respectively to one of the amplifiers 01 . . . 09 in FIG. 2. These amplifiers are arranged in such a way that an output signal will only appear when the medium blackening of the surface element which is imaged on the pertaining photo-electric transducer exceeds a predetermined degree of blackening. The outputs of the amplifiers 01 . . . 09 are connected with the first column 51 . . . 59 of the shift register 18. Both the columns and lines of the shift register 18 are connected among each other, as described in the parent patent. In addition thereto the outputs of the amplifiers 01 . . . 09 are assembled in the OR-stage 19. The output of this OR-stage 19 is led, on one hand, via the inverter stage 20 to the AND-stage 21 and, on the other hand, to the generator G1. This generator G1 is connected by the line X with all cells of the shift register 18, as is likewise described in the main patent. The outputs of the cells of the five upper lines are assembled in a linewise manner in OR-circuits 22 . . . 26, and the outputs of these OR-circuits are assembled in an AND-circuit 27. From AND-stage 27 there extends a line via an inverter stage 28 to the AND-stage 21, which is connected with the generator G2. This generator G2 is connected by the line Y with all cells of the shift register 18, as is described in the main patent. In addition thereto, a counter 30 is connected to the generator G2, said counter being connected with a comparator 31 and, via a switch 32, with a storage device 33. This storage device 33 is likewise connected with the comparator 31, the output of which leads to the generator G2.

If now a character is moved past the photo-electric transducers, then, at the outputs 01 . . . 09 of the amplifiers scanning signals will appear. Because of this, and via OR-circuit 19 the generator G1 will be rendered operative and, by the first output pulse, the transfer of the photocell markings to the first column of the shift register (51 . . . 59) is effected. The next successive generator pulse will then transfer the markings, as stored in column 1, to the column 2 (61 . . . 69) and will simultaneously transfer the new information from the photocells to the column 1 of the shift register. This process is repeated until finally the complete character is contained in the shift register. The generator frequency has to be tuned in such a way to the movement of the character, that an appropriate spacing will be produced for the evaluation. Normally, the surface elements to be scanned will be chosen to have an almost square shape when the cathodes of the photo-electric cells are square. Therefore, the character would have to be moved during the period between two pulses of the generator G1 by about the width of the photo-electric cell. Upon completion of the scanning of one character the generator G1 will be switched off again, because OR-circuit 19 indicates the absence of character input.

By this method of scanning, in which the beginning of the character determines the beginning of the transfer of the photocell marking to the shift register, identical characters in the line direction will always appear at the same point of the storage device, independently of any possible character displacements which are likely to happen during the printing. For this reason, a further centering in the line direction is no longer necessary. The setting or adjustment of the proper height position of the character within the shift register is now effected during the time interval between two characters. The character as contained in the shift register will be shifted upwardly until meeting against the upper line (51, 61 . . . 91). This shifting is effected by the output pulses of the generator G2. As long as one black marking does not appear in every one of the five top lines the AND-circuit 27 will not deliver any output markings. In this way the inverter stage 28 marks one input of the AND-stage 21, and the other input of this AND-stage 21 will be marked by the inverter stage 20, because the photo-electric cells no longer indicate "black." In this way the generator G2 will be switched on via the AND-stage 21 and will continue to operate until the character has reached the top line. Thereupon the AND-stage 27 will be rendered inoperative, provided that the character is at least five lines high and does not contain within this range any completely white horizontal lines. This is applicable to all figures. The supervision of several shift-register lines is necessary for avoiding a faulty centering by means of scanned character remainders from the neighbouring line in the case of a relatively strong oblique position of the document to be read, or in the case of a very narrow line spacing. Accordingly, in the case of a great line distance or line spacing the OR-stages 23 . . . 26 as well as the AND-stage 27 may be omitted.

Subsequently to this height centering the evaluation may be carried out via conventional types of coincidence circuits which are connected to the storage cells and which are adapted to connect the "black" or "white" points with each other which are characteristic for each character.

If, on account of an oblique position of the copy or pattern or document to be read, the complete neighboring line appears at the end of one line within the scanning area, then the additional device as indicated by the dashlines (29) will become necessary for effecting the centering to the desired character. The vertical steps which are necessary for effecting the centering are counted by means of a counter 30 in the course of each scanning operation. The resulting number is retained in the storage device 33 until the next successive digit or figure is being scanned, and this number is then compared with the new number of steps. The comparator 31 only permits the generator G2 to be rendered inoperative if the number of the new vertical steps does not or only slightly differ by a certain amount from the preceding number of steps. In this way a centering to an unwanted character lying above or below is avoided.

For the scanning of the characters, instead of the chain of photo-electric transducers, a light-spot scanner may be employed with the aid of a cathode-ray tube or any other similar arrangements which are well known from the television art. In FIG. 3 of the drawings an arrangement is shown for carrying out the light-spot scanning method. It is assumed that the recording medium 11 is moved in the direction as indicated by the arrow 12. The record means 11 is thereby illuminated by a cathode-ray tube 34 and an optical lens system 35. In the course of this method the beam is only deflected vertically in relation to the movement of the record means. The light as reflected by the character 14 is received by a photo-electric cell 36. To the photo-electric cell 36 there is connected a distributor 37 as shown in FIG. 4. In addition thereto, this distributor 37 is adapted to connect the outputs 1 . . . 9 of a ring counter 38 with the inputs of a storage chain 10 . . . 90. The outputs of this storage chain 10 . . . 90 are assembled or combined in the OR-stage 39. This OR-stage 39 corresponds to the OR-stage 19 and also has the same function. However, in addition a generator G4 is connected to the OR-stage 39, and via an inverter stage 40, to a generator G3. To both of these generators there is connected the ring counter 38. This ring counter 38 delivers, across the resistors W and the diodes D a steplike deflecting voltage to the cathode-ray tube 34. The output 0 of the ring counter 38 is connected via an AND-stage 41 with all of the storage devices of the storage chain 10 . . . 90. Also it is connected with all cells of the shift register 18 via the line X. The other input of the AND-stage 41 is connected with the output of the OR-stage 39. The outputs 10 . . . 90 of the storage chain correspond, with respect to their function, to the outputs 01 . . . 09 of the amplifiers in FIG. 2 of the drawings. As long as no character signals are indicated by the photo-electric cell 36, the generator G3 operates at a very high frequency. The pulses of this generator drive the ring counter 38, via which the cathode-ray tube is provided with its deflecting voltage. If, in the course of the light-spot scanning the character is reached then each output signal of the photo-electric cell will effect the connecting-through of the momentarily marked counter stage to the associated storage device. At the first signal the generator G4 is switched on via the OR-stage 39, and via the inverter stage 40 the generator G3 will be switched off. The generator G4 operates at a lower frequency. Now the pulses of the generator G4 will serve to operate the ring counter 38. As long as the generator G4 is operative, the contents of the storage chain will be erased in the stage 0 of the ring counter. This stage is also capable of taking over the function of the generator G1 during the recording or storing operation. If, at the end of the character and subsequently to the erase, the storage chain will remain free from signals, then the generator G3 will be switched on, and the generator G4 will be switched off. The remaining centering within the shift register will be carried out in accordance with the method as described hereinbefore.

In accordance with the showing of FIG. 2 the character is brought to the upper edge or border of the shift register for the purpose of being centered. For the recognition of letters containing interruptions or discontinuities, such as the letters *i*, *ä*, etc., a shifting towards the lower edge or border is deemed more appropriate and can be carried out just as well in accordance with the method as described in the foregoing.

The combinaations of logical circuits 22 . . . 28 and 19 . . . 21 as stated in FIG. 2 of the drawings may be converted in accordance with the rules as laid down by Boolian algebra and may be adapted to the specific technical embodiment.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Character identification apparatus comprising a two dimensional shift register, having rows and columns of cells, means for causing a pattern on said register to shift in one coordinate direction, transducer means for reading intelligence characteristics of a successive group of discrete areas on a record blank and producing signals therefrom, each group being in a line substantially perpendicular to the desired direction of relative movement between said blank and transducer means, means for transferring signals from said transducer means to a predetermined column of said shift register cells, means responsive to the operation of said transducer means for operating said transferring means, means also responsive to the operation of said transducer means for advancing the signals in said predetermined column through the register in a predetermined direction perpendicular to said column, means responsive to the absence of signals from said transducer means for discontinuing the operation of said advancing means, whereby the combination of operative cells in said register may be used to identify the intelligence read from said record blank, and means responsive to a predetermined condition of a predetermined group of cells of said shift register for causing the signal pattern in said register to shift in a direction perpendicular to the advancing direction until said pattern reaches a predetermined position, whereby said pattern is centered in said register.

2. Character identification apparatus, as defined in claim 1, in which the means for advancing the signals in the register comprises a first pulse generator, and the means for shifting the signal pattern in said register comprises a second pulse generator, said second pulse generator operating at a higher pulse rate than said first pulse generator.

3. Character identification apparatus comprising a two-dimensional shift register having rows and columns of cells, means for causing a pattern on said register to shift in one coordinate direction, single transducer means, means for causing said transducer means to scan areas on a record blank in a line substantially perpendicular to the desired direction of relative movement between said blank and said transducer means, and to produce signals corresponding to the intelligence thereon, a chain of storage elements, there being one for each row of said shift register, means to distribute successive portions of said signals to respective of said storage elements, means responsive to the termination of the operation of said distributing means for transferring signals from said storage elements to a predetermined column of said shift register and for simultaneously erasing the signals stored in said chain of storage elements, and means for causing said shift register to advance one column each time signals are transferred to said predetermined column, whereby signals representing a character on the record blank will be registered in said shift register, said distributing means comprising a counter having a plurality of stages corresponding to the number of elements in said storage chain plus an additional stage and means controlled by said counter for operating said scanning means while simultaneously connecting said storage elements with said transducing means in the order of the operation of said counter stages, said means for transferring signals to said shift register including said additional stage and means connected to said stage for erasing signals in said chain of storage elements and transferring the signals to said shift register.

4. Character identification apparatus, as defined in claim 3, further comprising means for operating the counter at one rate when the transducing means is producing signals and at a different rate when said transducing means is not producing signals.

5. Character identification apparatus, as defined in claim 4, in which the means for operating the counter comprises two pulse generators operating at different frequencies and means responsive to the presence or absence of signals from said transducing means for operating one or the other of said generators.

References Cited in the file of this patent

UNITED STATES PATENTS

| | | |
|---|---|---|
| 2,886,799 | Crooks | May 12, 1959 |
| 2,889,535 | Rochester | June 2, 1959 |
| 2,932,006 | Glauberman | Apr. 5, 1960 |

OTHER REFERENCES

"Character Recognition," by Glauberman, Electronics, February 1956, pp. 132 to 136.

"Photoelectric Reader Feeds Business Machines," by Shepard and Heasly, Electronics, May 1955.